United States Patent [19]
Ayala

[11] Patent Number: 5,288,263
[45] Date of Patent: Feb. 22, 1994

[54] APPARATUS FOR OPENING SHELLFISH OR THE LIKE

[76] Inventor: Federico Ayala, 4571 Bonanza La., Dallas, Tex. 75211

[21] Appl. No.: 44,473

[22] Filed: Apr. 9, 1993

[51] Int. Cl.⁵ ............................................. A22C 29/04
[52] U.S. Cl. ...................................... 452/16; 30/120.1
[58] Field of Search ............................. 452/16, 13, 17; 30/120.1

[56] References Cited

U.S. PATENT DOCUMENTS

| | | | |
|---|---|---|---|
| 10,810 | 4/1854 | Towers | 452/16 |
| 189,966 | 4/1877 | Temple | 452/16 |
| 210,032 | 11/1878 | Heimlich | 452/16 |
| 896,162 | 8/1908 | Roters | 452/16 |
| 1,041,198 | 10/1912 | Tiffany | 425/16 |
| 1,510,313 | 9/1924 | Dickerson | 452/16 |
| 1,741,015 | 12/1929 | Delonde | 452/16 |
| 2,437,609 | 6/1949 | Plock | 452/16 |
| 2,703,522 | 3/1955 | Smith | 452/16 |
| 3,748,692 | 7/1973 | Valentino | 452/16 |
| 3,886,628 | 6/1975 | Berry | 452/16 |
| 4,348,788 | 9/1982 | Jurcak | 452/16 |
| 4,393,546 | 7/1983 | Ruiz | 452/16 |
| 4,796,333 | 1/1989 | Stinson, Jr. et al. | 452/16 |

Primary Examiner—Willis Little
Attorney, Agent, or Firm—Drude Faulconer

[57] ABSTRACT

An apparatus for opening a shellfish (e.g. oysters and/or clams) along its seam. The apparatus is comprised of a base having (1) a knife pivotably mounted about a first axis on said base; and (2) a hammer pivotably mounted about a second axis on said base. A link slidably connects the knife to the hammer so the knife is lifted by extended upward movement of the hammer but the hammer is free to move relative of the knife during downward movement. In operation, the knife is raised by upward movement of the hammer to a height where a shellfish can be positioned below the knife. The hammer is then lowered to align knife onto the seam of the shellfish after which the hammer is dropped or pushed down to deliver an impact to the knife, causing it to penetrate the seam and open the shellfish.

20 Claims, 1 Drawing Sheet

APPARATUS FOR OPENING SHELLFISH OR THE LIKE

DESCRIPTION

1. Technical Field

The present invention relates to an apparatus for opening shellfish (e.g. oysters and/or clams) and in one of its aspects relates to an apparatus for opening shellfish having a knife and a hammer pivotably mounted about different axes on a base plate wherein the knife is capable of being positioned onto the seam of the shell of the shellfish and then being impacted by the hammer to open the shell.

2. Background Art

As is common knowledge, the hinged shell protecting the meat of shellfish (e.g. oysters and clams) is extremely difficult to open due to the strong muscle or tissue which holds the two halves of the shell together. To open such shells, the seam between the two halves must be penetrated and this tissue cut along the seam. There are some people who can easily and quickly accomplish this feat merely by using a sharp knife or like tool but normally this skill is acquired, if ever, only after long periods of exasperating practice. For an unskilled person to attempt to open an oyster or clam in this manner, it is not only difficult but it may also be dangerous in that the sharp knife can easily slip and cause injury.

For at least a century or more (see U.S. Pat. No. 10,810, issued Apr. 18, 1854), man has been trying to build the "better mousetrap" for opening shellfish. This early patented device along with other similar devices have been proposed for carrying out this task. These devices are similar in that all are comprised of similar or equivalent elements which, when assembled in a particular manner, provide a shellfish opener which that respective inventor apparently felt was better than those available at the time.

More specifically, this particular-type of shellfish openers is basically comprised of a base plate having a operating lever pivotably mounted thereon. A wedge (knife) is attached to and is carried by the lever. The shellfish is positioned on the base plate and the a lever is forced downward to drive the wedge into the seam of the shellfish to open same. This requires a a certain amount of dexterity in that the shellfish must be precisely positioned below the wedge and in most models must be manually held while it is being opened. This still presents some risk to the operator in that the wedge can slip on the shell and contact the fingers of the holder. For further examples of this type of shellfish openers, see U.S. Pat. Nos. 189,966 (1877); 210,032 (1878); 896,162 (1908); 1,041,198 (1912); 2,473,609 (1949); 3,748,692 (1973); 3,886,628 (1975); and; and 4,393,546 (1983).

Another recent shellfish opener of this type is disclosed in U.S. Pat. No. 4,348,788 wherein a elongated lever is pivotably mounted on a base plate. A wedge is fixed to and is carried by the lever. A shellfish is positioned and held on a roughened area of the base and the lever is moved downward with force to drive the wedge into the seam of the shellfish. While this device may successfully open a shellfish, as mentioned above, it requires a sustantial downward dynamic force which may cause injury if the wedge misses the seam and slips down the side of the shell. Also, the force applied to the wedge may cause early failure in that it may break off from the lever. Accordingly, the search for the "better mousetrap", (i.e. better shellfish opener) goes on.

SUMMARY OF THE INVENTION

The present invention provides and apparatus for opening shellfish (e.g. oysters and/or clams) along the seam naturally occurring between the hinged portions of the shell of a shellfish. The present apparatus is comprised of a base having (1) a knife pivotably mounted about a first axis on said base and movable between a first position where said knife rests on said seam of said shellfish when said shellfish is in an operable position on said base and a second position where said knife will penetrate said seam of said shellfish to open said shellfish; and (2) a hammer pivotably mounted about a second axis on said base and movable between a first position where said hammer means lies above said knife and a second position where said hammer means will deliver an impact to said knife to drive said knife to its second position.

More specifically, the shellfish opener of the present invention preferably has a rectangular base plate having a roughened area which, in turn, is formed of a plurality of holes which assist in holding a shellfish in an operable position on the base. A support is secured on the base plate and has both a knife and a hammer pivotably mounted about different axes thereon. Stops are provided to limit the downward travel of both the knife and the hammer. A link is provided to slidably connect the knife to the hammer whereby extended upward movement of the hammer will lift the knife but will allow the hammer to move relative to the knife during downward movement.

In operation, the hammer, hence the knife, is raised until the knife is at a height at which a shellfish can be positioned on the roughened area of the base below the knife. The hammer is then lowered to align the knife onto the seam of the shellfish. The hammer is then dropped or pushed down to deliver an impact to the knife thereby causing the knife to penetrate the seam and open the shellfish.

BRIEF DESCRIPTION OF THE DRAWINGS

The actual construction, operation, and apparent advantages of the present invention will be better understood by referring to the drawings in which like numerals identify like parts, and in which.

BEST KNOWN MODE FOR CARRYING OUT THE INVENTION

Figure 1:
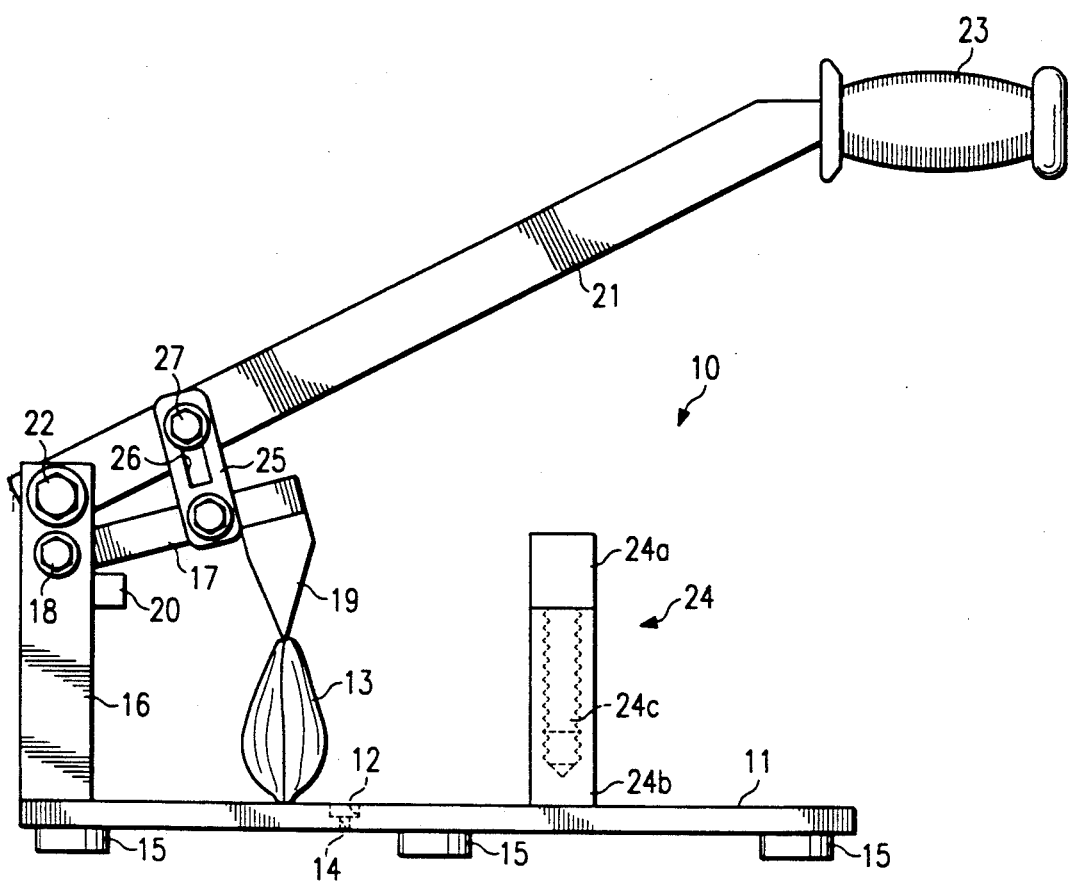
FIG. 1 is an elevational view of the shell fish opener in accordance with the present invention.
Figure 2:
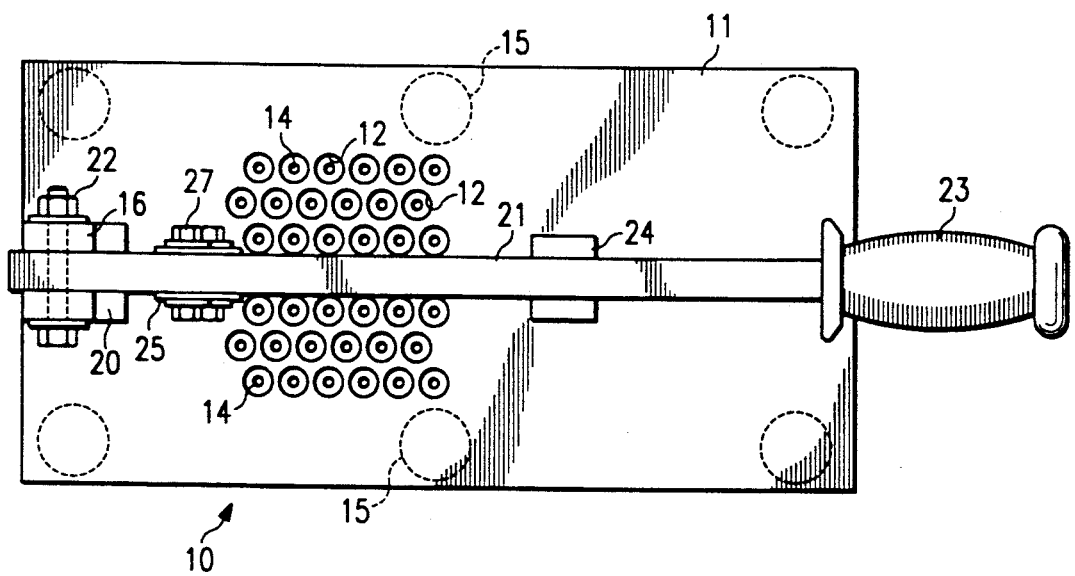
FIG. 2 is a top view of the opener of FIG. 1.

Referring more particularly to the drawings, FIGS. 1 and 2 illustrate a shellfish opener in accordance with the present invention. Apparatus 10 for opening shellfish (e.g. oysters, clams, and the like) is comprised of a base plate 11. Preferably, base plate 11 is rectangular ($6'' \times 12'' \times \frac{1}{4}''$) and is made of stainless steel. A plurality of holes 12 are drilled or otherwise provided in close proximity to each other (only some shown) in the upper surface of base plate 11 to provide a roughened area thereon to assist in holding the shellfish 13 in an operable position (FIG. 1). At least a portion 14 of each hole 12 extends all the way through base plate 11 to aid in cleaning as will be further explained below. A plurality of means (friction pads or feet 15) are spaced and secured about the periphery of the underside of base plate 11 to stabilize the base plate on a surface.

Support 16 is centered and secured at one end of base plate 11 and extends upward therefrom (e.g. approximately 5"). Arm 17 (e.g. approximately 4¾" long) has one end pivotably mounted on support 16 about a first axis 18 and has a wedge or knife 19 secured to and extending downward from the other end. While knife 19 can be made integral with or can be affixed to arm 17 by welding or the like, preferably it is attached to arm 17 by screws or bolts or the like so that knife 18 can easily be replaced if the need arises. Stop 20 is also mounted on support 16 below arm 17 to limit the downward movement of the arm as will be further discussed below. Stop 20 is preferably positioned approximately 3⅛" above base plate 11 which will provide adequate clearance for opening the wide range of different-sized shellfish most commonly encountered, but the stop 20 can be made adjustable on support 16, if desired.

A relatively heavy, elongated lever or hammer 21 (e.g. approximately 16" long) has one end pivotably mounted about a second and separate axis 22 on support 16 which lies above first axis 18 and has a handle 23 or the like at the other end. Another stop 24 is positioned on the upperside of base plate 11 and extends upward therefrom to limit downward movement of the hammer 21. Stop 24 preferably extends approximately 3⅞" above base plate 11 which, again provides adequate movement for opening most shellfish, but it, too, can be made adjustable. For example, stop 24 can be made in two pieces 24a, 24b with one piece 24a having a threaded portion 24c which threads into or out of the other piece 24b to adjust the height of the stop 24. Link 25 is connected to arm 17 and has a slot 26 therein. A bolt 27 or the like extends through slot 26 and is connected to hammer 21 for slidable movement therewith.

In operation, apparatus 10 is preferably positioned on a flat and stable surface and hammer 21 is raised by an operator lifting the handle 23. As hammer 21 is lifted, the bolt 27 will engage the end of slot 26 in link 25 which, in turn, will cause the continued upward movement of the hammer to move arm 17 and knife 19 about its axis 18. Movement of hammer 21 continues until knife 19 is at a height at which the shellfish 13 can be positioned where the seam naturally-occurring between the halves of the shell is exposed to knife 19. The roughened area provided by holes 14 will assist in steadying shellfish 13 in position.

Next, hammer 21 is lowered slightly to accurately align knife 21 onto the seam of the shellfish. Hammer 21 is then dropped or is pushed down with force to drive the hammer against arm 17 and deliver an impact to knife 21 which causes the knife to penetrate the seam and opens the shellfish 13. Arm 17 comes to rest on stop 20 while hammer 21 will engage stop 24. It can be seen that due to the pivotable movement of both the hammer and the arm, a relatively large range of different sized shellfish can be opened with the present apparatus without any adjustment being necessary. Furhter, since the entire apparatus is preferably made of stainless steel, clean-up is simple and sanitary. The apparatus can easily be rinsed with water to wash away dirt, small shell fragments, and/or oyster juice or the like. Any residue collected in holes 14 will be flushed through the openings 15 of the respective holes 14.

What is claimed is:

1. An apparatus for opening shellfish (e.g. oysters and/or clams) along the seam formed between the hinged portions of the shell of said shellfish, said apparatus comprising:

a base; a support mounted on said base a knife pivotably mounted about a first axis on said support and movable between a first position where said knife rests on said seam of said shellfish when said shellfish is in an operable position on said base and a second position where said knife will penetrate said seam of said shellfish to thereby open said shellfish; and hammer means pivotably mounted about a second axis on said support and movable between a first position where said hammer means lies above said knife and a second position where said hammer means will deliver an impact to said knife to thereby drive said knife to its second position.

2. The apparatus of claim 1 wherein said hammer means comprises:

an elongated lever having a first end pivotably mounted about said second axis.

3. The apparatus of claim 2 including:

a handle mounted on the other end of said lever.

4. The apparatus of claim 2 including:

a first stop for limiting movement of said lever towards said base; and a second stop for limiting movement of said knife towards said base.

5. The apparatus of claim 4 wherein said first stop is adjustable.

6. The apparatus of claim 1 including:

a roughened area on said base which lies substantially below said knife to assist in holding a shellfish in an operable position on said base.

7. The apparatus of claim 6 wherein said roughened area is comprised of a plurality of holes provided in the surface of said base in close proximity to each other.

8. The apparatus of claim 7 wherein at least a portion of each of said holes extend through said base.

9. The apparatus of claim 2 including:

a link slidably connected between said knife and said lever wherein said knife is lifted to its said first position when said lever is moved towards its first position but allows relative movement between said knife and said lever when said lever moves towards its second position.

10. The apparatus of claim 2 wherein said knife comprises:

an arm having one end pivotably mounted about said first axis; and a wedge secured near the other end of said arm and depending downward therefrom.

11. The apparatus of claim 2 including:

means on the underside of said base for stabilizing said base on a surface.

12. An apparatus for opening shellfish (e.g. oysters and/or clams) along the seam naturally-occurring between the hinged portions of the shell of said shellfish, said apparatus comprising:

a retangular base plate;

a support secured near one end of the upper surface of said base plate and extending upward therefrom;

a knife pivotably mounted on said support about a first axis and movable between a first position where said knife rests on said seam of said shellfish when said shellfish is in an operable position on said base and a second position where said knife will penetrate said seam of said shellfish to thereby open said shellfish; and hammer means pivotably mounted on said support about a second axis base and movable between a first position where said hammer means lies above said knife and a second position where said hammer means will deliver an impact to said knife to thereby drive said knife to its second position.

13. The apparatus of claim 12 wherein said hammer means comprises:

an elongated lever having a first end pivotably mounted about said second axis; and a handle mounted on the other end of said lever.

14. The apparatus of claim 13 wherein said knife comprises:

an arm having one end pivotably mounted about said first axis; and a wedge secured near the other end of said arm and depending downward therefrom.

15. The apparatus of claim 14 including:

a first stop for limiting movement of said lever towards said base plate; and a second stop for limiting movement of said knife towards said base plate.

16. The apparatus of claim 15 including:

a roughened area on said upper surface of said base plate which lies substantially below said knife to assist in holding a shellfish in an operable position on said base plate.

17. The apparatus of claim 16 wherein said roughened area is comprised of a plurality of holes provided in said upper surface of said base plate in close proximity to each other.

18. The apparatus of claim 17 wherein at least a portion of each of said holes extend through said base plate.

19. The apparatus of claim 18 including:

means on the underside of said base plate for stabilizing said base plate on a surface.

20. The apparatus of claim 19 wherein said means on said underside of said base comprises:

a plurality of friction pads spaced about the periphery of said underside of said base plate.

* * * * *